United States Patent [19]

Thumm

[11] Patent Number: 4,942,045
[45] Date of Patent: Jul. 17, 1990

[54] GRAPE JUICE CONCENTRATE

[75] Inventor: Hermann J. Thumm, Lyndoch, Australia

[73] Assignee: Chateau Yaldara Pty. Ltd., Lyndoch, Australia

[21] Appl. No.: 264,337

[22] Filed: Oct. 28, 1988

[51] Int. Cl.$^5$ .......................... A23L 2/08; C12G 3/00
[52] U.S. Cl. ...................................... 426/11; 426/13; 426/14; 426/15; 426/592; 426/494; 426/495; 426/599
[58] Field of Search .................. 426/492, 11, 387, 14, 426/15, 493, 494, 495, 51, 599, 330.4–330.5, 422, 13, 592

[56] References Cited

U.S. PATENT DOCUMENTS

| | | | |
|---|---|---|---|
| 3,165,435 | 1/1965 | Henszey | 426/492 |
| 3,367,787 | 2/1968 | Thijssen et al. | 426/492 |
| 4,597,978 | 7/1986 | Dimitriou | 426/492 |
| 4,687,671 | 8/1987 | Husain et al. | 426/492 |

FOREIGN PATENT DOCUMENTS 0135175 3/1921 United Kingdom .

Primary Examiner—Marianne Cintins
Attorney, Agent, or Firm—Robert L. Finkel

[57] ABSTRACT

In this invention, a grape juice concentrate is produced by crushing grapes to extract grape juice (10, 11), subjecting the grape juice to a first stage vacuum concentration (19) before it ferments by heating the grape juice and subjecting it to a low pressure (vacuum) to separate it into a distillate and a grape juice concentrate which has a Baume between 25 and 40, subsequently subjecting the concentrate to a second stage of vacuum concentration (31), also by heating under vacuum conditions, and packaging (42) the second stage concentrate when its Baume lies between 38 and 55. The second stage concentrate can be creamed (43) by high speed agitation before packaging, provided it is sufficiently fluent (e.g. a Baume of 40).

12 Claims, 3 Drawing Sheets

GRAPE JUICE CONCENTRATE

This invention relates to a method for producing a grape juice concentrate.

It has been found that grape juice concentrate can simulate the flavour of honey, and the term "grape honey" has been applied to the product of this invention by those people who have sampled it. In fact it contains most of the constituents of honey, in most cases in somewhat similar proportions, containing fructose, glucose and water. Grape juice processed by this invention has the additional advantage over honey in that it is a very hygienic product, at least as hygenic as honey which, in being a product transmitted by insects, can be subject to various contaminants, including yeasts which are likely to cause fermentation if the Baume drops below about 45. However, no fermentation of creamed grape juice concentrate has ever been observed when the solids content exceeded 38 Baume.

PRIOR ART

Prior art known to the Applicant includes that in the Australian Patent No. 460403 and 460434, previous patents of the Inventor and referred to herein. Textbook art is described in AMERINE et al. "The Technology of Winemaking", third edition by the AVI Publishing Co., Inc., Westport, Conn. (pages 618–631) and HERSTEIN et al., "Chemistry and Technology of Wines and Liquors", second edition, D. van NOSTRAND & Co., Inc., New York, 1948 (pages 99–110 and 160–165). Reference can also be made to the U.S. Pat. Nos. 1,362,870 Johnson; 1,381,613 Avis; 1,870,588 Rooker; 2,016,584 Ash; and 2,690,972 Bradshaw. No prior art at all is known to the Applicant of any method of producing a grape juice concentrate from fresh grape juice by separating the grape juice into a distillate and a first stage concentrate of up to 40 Baume, and subsequently further concentrating the first stage concentrate to a second stage and packaging concentrate useful as a food product having a Baume of between 38 and 55.

BRIEF SUMMARY OF THE INVENTION

In the production of wine, a great deal of activity occurs at the time of vintage. There is very little time for the production of such bi-products as food products which can be used as alternatives as honey, and it is valuable to be able to store grape juice which has been clarified until after the winemaking process has been partly completed and the wine is left to mature. However the volume of wine or grape juice required for the production of a food product is very great indeed, and therefore it is most desirable that storage take place of a concentrate. One of the objects of this invention therefore is to provide a method whereby a quickly and easily produced first stage concentrate can be stored cheaply and economically, which can subsequently be further concentrated into a food product, or otherwise processed.

Many wineries also have distilling facilities, comprising fractionating stills. At the time of vintage a still is seldom in use, and if therefore a still is used to remove aqueous vapours from grape juice, the fractionating facilities of the still can also be employed to separate out the aromatics which are valuable for reinsertion into a final product. This applies whether the final product is a juice drink or whether it is a semi-solid or solid food product, and an object of this invention is to provide a method whereby the aromatics are useable in the food product.

In this invention a grape juice concentrate is produced by crushing grapes to extract grape juice, subjecting the grape juice to a first stage vacuum concentration before it ferments by heating the grape juice and subjecting it to a low pressure (vacuum) to separate it into a distillate and a first stage grape juice concentrate which has a solids content between 25 and 40 Baume (45% and 72% solids), storing the first stage concentrate in the presence of alcohol, subsequently subjecting that concentrate to a second stage of vacuum concentration, also by heating under vacuum conditions, and packaging the second stage concentrate when its Baume lies between 38 and 55. (At 55 Baume the product becomes solid sugar.)

The first stage concentrate is sufficiently viscous that it is capable of supporting a thin layer of alcohol, evaporation of which can be inhibited by sealing the container in which the first stage concentrate is stored. The concentrate can be withdrawn from the base of the container, and the alcohol recovered, firstly in liquid form by decanting, and secondly during the second stage of concentration, by fractional distillation (if required).

If, however, the first stage concentrate is allowed to slowly ferment, the concentrate will develop excellent flavours which enhance the final product, whether it be a concentrate or a fruit juice drink, and the alcohol of fermentation is a valuable by-product.

The second stage concentrate can be creamed by high speed agitation before packaging, provided it is sufficiently fluent (e.g. a Baume of 44, or 80% solids). The second stage concentrate can also be used for a fruit juice drink, but mixing is more difficult than with the first stage.

Production of a fruit juice drink is a valuable adjunct to this invention.

If the first stage concentrate, or fresh grape juice, is merely mixed with water, a grape juice drink having a solids content of between 4 and 8 Baume can be obtained quite readily, and it is possible to preserve such a drink, for example by pasteurization, or addition of preservatives. However such a drink is less palatable than a drink which comprises the distillate, for the reason that the distillate contains some aromatics and other fractions which add to flavour. Furthermore the distillate contains no sugar, and is easily stored.

Several alternatives are available to an operator when using this invention:

(a) He can mix the distillate with fresh grape juice, and preserve by pasteurizing or by adding preservatives, or both, (b) He can partially separate the distillate, and remix with some of the concentrate before its Baume reaches 46 (83% solids), and further concentrate the remainder of the concentrate until the Baume reaches the range of 38 to 55 (68% to 100% solids) for packaging as a food product, (c) Since the process is a two-stage concentration, initial distillation can terminate when the first stage concentrate has a Baume of about 35 (63% solids), and portion of it is then remixed with the distillate to provide a palatable drink which has a Baume of between 4 and 8, preferably about 6. In order to safeguard the 35 Baume raw material for the rest of the year's production of the two products, the first stage base material from both early and late vintage can be stored beneath a layer of alcohol, or preferably, be allowed to ferment (it can drop to 25 Baume). The fermentation process provides a convenient method to preserve the base material for later use for the two products, after the alcohol has been extracted under vacuum.

The fermented grape juice provides a much more palatable grape drink with a wine character. (d) If the program (c) is selected, the stored concentrate need not be used solely for preparation of a grape juice drink. Alternatively it can ferment slowly and be used for grape juice concentrate and brandy.

After the vintage and at a convenient time during the next 11 months the first stage concentrate can again be put under vacuum and separated from the alcohol which provides brandy, and also base product for the grape juice drink. After further concentration to 38–55 Baume (or 68% –99% solids) it can in turn be bottled as a highly nutritious grape juice concentrate, with a flavour enhanced by subsequent mixing of aromatics.

(e) The operator can continue distillation until the concentrate reaches 38 to 55 Baume, and use portion only of the concentrate to remix with the distillate, bottling both the remixed distillate (as a grape juice drink), and the concentrate, while hot.

(f) The operator can elect what mixtures to make from grape juice, distillate including aromatics, and concentrate.

Products, such as honey, which contain a large amount of fruit sugar, tend to crystallise when stored. Although such products do not lose flavour or otherwise deteriorate due to crystallisation, they have an inferior appearance which reduces marketability. With natural honey, this difficulty is met by 'creaming' the honey by the Dyce process, developed at the Cornell Agricultural Station in U.S.A. Slightly more than five percent of finely granulated honey is embodied into fluent honey, and the mixture is agitated for about 15 minutes, care being taken to prevent incorporation of small air bubbles, which will rise to the surface and form a scum, and which may contain yeast cells which may later cause fermentation. Natural honey can ferment when its Baume drops below about 45 (81% solids), due to the presence of wild yeast.

An object of this invention is to provide a product which is unlikely to crystallise when stored. Another object is to provide a product which is unlikely to ferment, even when its Baume is as low as 40 (72% solids).

In an embodiment of the invention, the grape juice concentrate at between 38 and 53 Baume (68% and 95% solids) is subjected to high speed stirring with an impeller. By varying the Baume, time and stirring speed, the concentrate can be "creamed", or can be brought to the consistency of butter, without risk of subsequent fermentation. There is no necessity for "seeding" with fine granulations, as exists in natural honey, although such seeding expedites production if the second stage concentrate has stood for a period less than about a week before creaming.

The term Baume is a measure of density which is commonly used in the wine industry. Pure water is regarded as having a Baume of 0, while a liquid having the same specific gravity as a 10% sodium chloride solution (1.074 at 20° C.) is regarded as 10 Baume. One degree of Baume is about 18 grams per litre of sugar. The term Brix is merely a term indicating a percentage of solids. 100 Brix equals 100% solids, and about 55.5 Baume. There is a direct relationship between the Baume and Brix scales throughout the relevant range, at least insofar as this specification is concerned.

If alternative (c) is selected (and this is a preferred alternative), the invention provides a method of preparing a large quantity of base material which can be made in a comparatively short time during vintage, and can come from surplus fruit which is frequently available. The base material can then be kept safely until next vintage before it is utilised for the final products. It provides a cheap method to prepare and preserve the grape sugar comprising fructose and glucose, necessary for the grape juice drink and also for the second stage concentrate.

Fresh grape juice is extremely sensitive, subject to fermentation and therefore very difficult to preserve for a year's production of various grape products other than alcoholic. This invention provides a cheap method to solve that problem by the first stage concentration of the fresh juice to 35 Baume (up to 40 Baume). It can then be stored without crystallising, and allowed to slowly ferment. Such fermentation provides protection from contamination and provides a protective $CO_2$ blanket for the ullage space in the container above the concentrate, and the yeast also reduces the $SO_2$ added under the crusher to a harmless minimum for the subsequently produced brandy and grape juice concentrate.

It also provides a way to utilise the fruit for the full course of the harvesting season, using the early fruit which is low in sugar and high in acid for the non-alcoholic grape drink, and the later grapes very high in their natural fruit sugars for the grape honey or the second stage concentrate.

BRIEF DESCRIPTION OF THE DRAWINGS

An embodiment of the invention is described hereunder in some detail with reference to and as illustrated in the accompanying drawings, in which.

The products of this embodiment are produced in three stages:

1. PRODUCTION OF BASE MATERIALS

Grapes are selected in the same way as they would be selected for the production of wine, that is, they are reasonably free of bad or damaged berries. They are fed to a crusher 10 and crushed with the addition of about 70 parts per million of sulphur dioxide and are immediately pressed in grape press 11 to separate the pulp (pips, skins and stalks) from the juice, which is then transferred to a vat 12 where enzymes and bentonite are added for clarifying and de-acidifying, as in a wine making process. In the vat 12, and in a subsequent centrifuge 13 (if used) the grape juice from the crushing is separated from the pulp via a wine press to assist in the expulsion of juice, but the process so far described is a standard winemaking process and is commonly used in the production of almost all wines.

Figure 1:
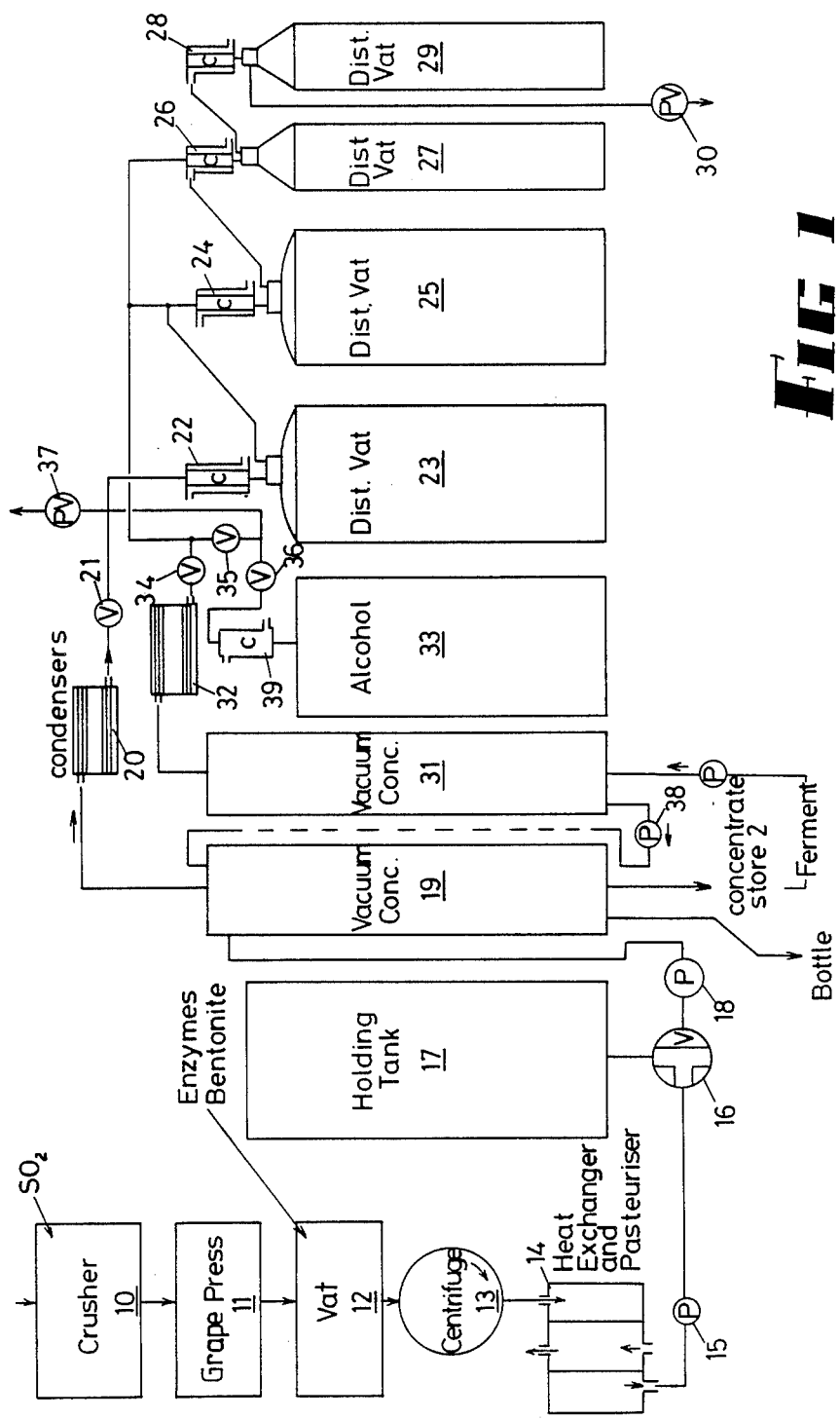
FIG. 1 illustrates diagrammatically the steps of the process.
Figure 2:
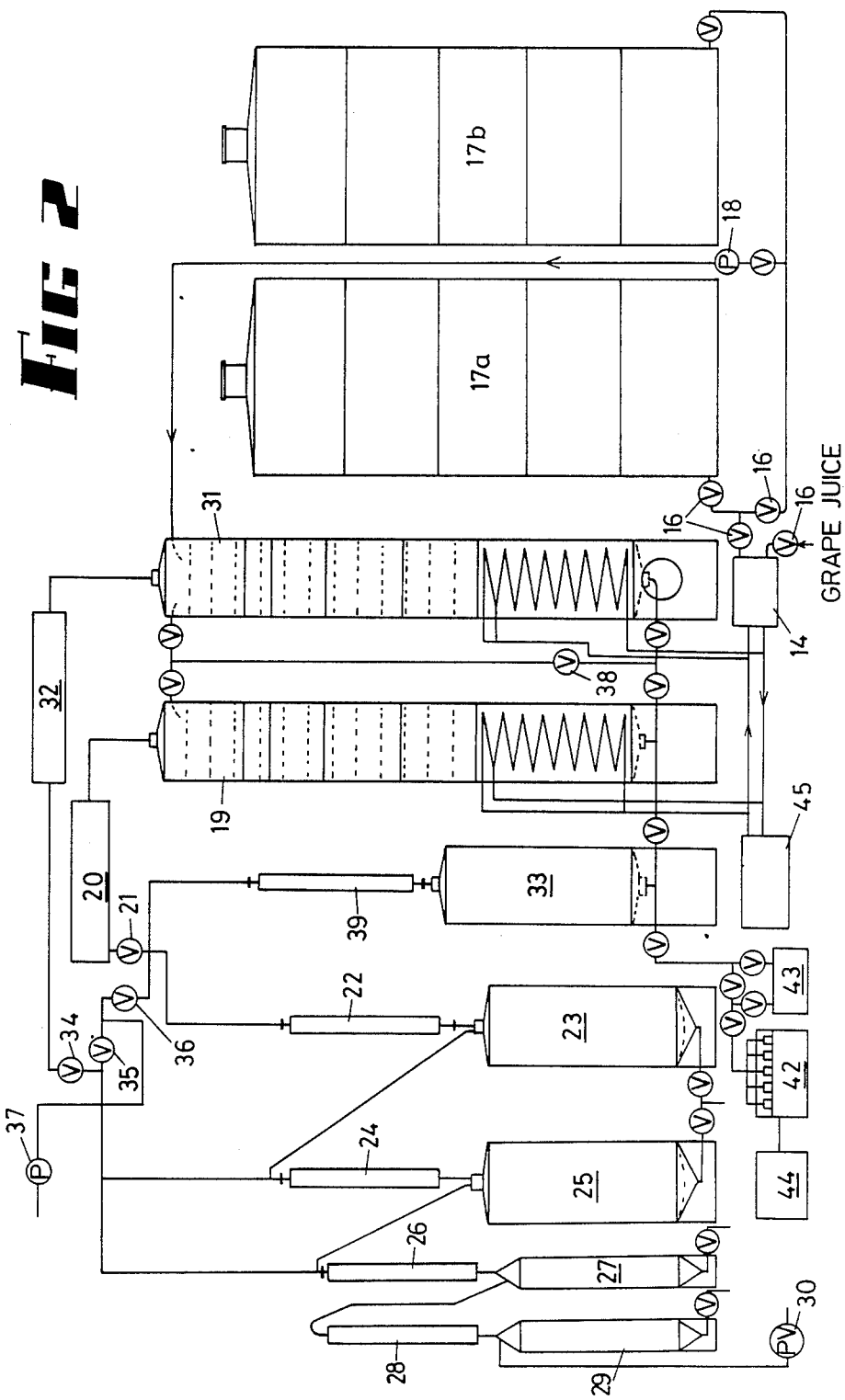
FIG. 2 illustrates diagrammatically the concentrating equipment which is used in the process.

The pre-prepared grape juice is pumped by the pump 15 through a heat exchanger 14 into either one or both of the holding tanks 17a and 17b through the control valves 16 (FIG. 2). In the heat exchanger 14 the juice is heated to about 65° C. and thereby is pasteurized to prevent fermentation.

The pump 18 pumps the juice when required from the holding tanks 17a and 17b into the vacuum concentrating column 19.

The grape juice in the vacuum concentrate column 19 is separated into a distillate and a first stage grape juice concentrate of 35 Baume. The first stage concentrate should not be less than 25 Baume (63% solids) and not more than 40 Baume (72% solids). The distillate is carried through the condenser 20 the valve 21, and then progressively through the condenser 22 into distillate vat 23, condenser 24 into distillate vat 25, condenser 26 into distillate vat 27, and condenser 28 25. into the distillate vat 29. These vats contain the grape juice distillates and the aromatics in varying degrees of aromas and provide the operator with an opportunity to subsequently blend the products.

However, this is the first stage of production of the base material comprising the distillates and the first stage concentrate which would normally be at 35 Baume but can range between 25 and 40 as said above. For the distillation process to be effected, the vacuum pump 30 retains a low pressure in the vats and also in the vacuum concentrating column 19.

The first stage concentrates are then removed from the column 19 and from the vats and stored in stainless steel containers where they can remain for as much as 11 months.

2. PRODUCTION OF BRANDY, GRAPE JUICE CONCENTRATE FOR TABLE USE AND LOW CALORIE GRAPE JUICE DRINK.

The base materials from the first stage are mixed to provide the low calorie grape juice drink having a Baume of about 6 (10% solids). Some of the first stage concentrate having a Baume of about 35 may be used direct from early in the vintage and mixed with grape juice from later in the vintage if required, but the later vintage concentrate can alternatively be fermented as described below.

The distillate will contain sufficient sulphur dioxide which was originally injected at the crushing stage, but carried over during distillation to provide it with full protection until used for grape juice blending.

The first stage concentrate of about 35 Baume which is not immediately used is stored and allowed to ferment. Because of its high Baume the fermentation will be a very slow process, but will initially provide a protective $CO_2$ blanket for its ullage space in the container until it is removed for further processing, and the yeast required for fermentation will reduce the $SO_2$ content to a harmless level. Without this the $SO_2$ content could be detrimental to some subsequent products.

However the first stage concentrate as fermented will contain alcohol and its Baume will reduce, but only to a minimum of about 25 Baume. This first stage concentrate is then de-acidified to a pH of between 4 and 5 by addition of particulate calcium carbonate, and subsequently pumped into the vacuum concentrating column 31, use being made of the vacuum pump 37 to place that column under sub-atmospheric pressure. The first stage concentrate is heated in the column 31 and the alcohol is passed through the condenser 32 and the secondary condenser 39 into the alcohol vat 33, the alcohol then being suitable for production of a high quality brandy. The higher temperature distillate is obtained by pumping the residual contents of the column 31 into the column 19 with the concentrate pump 38. Further concentration then takes place to remove the water and provide the required Baume of between 40–52 (that is, 72% to 94% solids, the maximum range being Be38–55), which concentrate, if fluent, is then passed down from the column 19 into the bottling plant 42 (FIG. 2). The valves 34, 35 and 36 are used to control the flow of distillate from both the columns 31 and 19, the watery distillate being directed into the vats 23, 25, 27 and 29 as described above.

3. CREAMING OF CONCENTRATE

Figure 3:
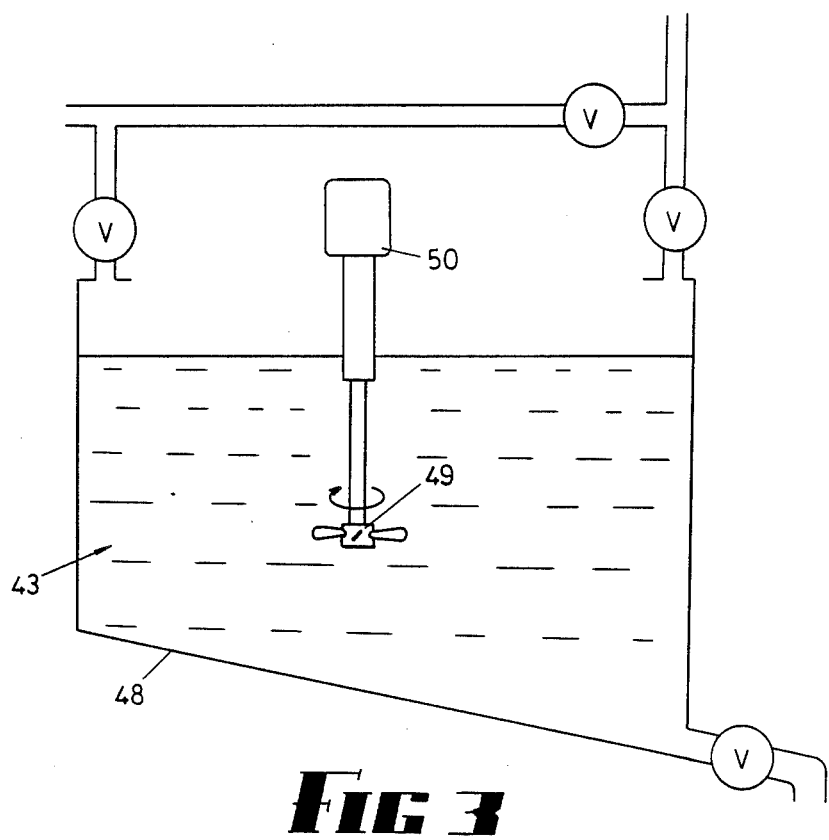
FIG. 3 illustrates diagrammatically the creaming plant.

The bottling plant 42 is associated with a creaming plant 43 shown diagrammatically in FIG. 3, wherein the second stage concentrate product is creamed by seeding (if necessary) and passing into a vat 48 at about 20° C., in which it is very rapidly stirred with an impeller 49 driven by motor 50 at high speed (about 5000 RPM) for about 15 minutes). The impeller comprises a pair of blades about 100 mm long, and inclined at about 10°. If 15. the concentrate does not stand for at least a week, it is "seeded" by addition of a small quantity of previously creamed concentrate, but the product is smoother if creaming takes place without seeding. The Baume of the concentrate, its temperature, and time of stirring all have an effect on the creaming, and the concentrate can be creamed to the consistency of creamed honey, of refrigerated butter, or any consistency therebetween. This is an unexpected result. Concentrate of a lower Baume, for example 40 Baume (72% solids), can be creamed and will remain soft. Thorough testing has not shown any sign of fermentation of such a product, and if packaged hot, or otherwise under sterile conditions, it will not readily deteriorate. Above 48 Baume (86% solids), there is no need to observe sterility precautions.

Labelling and packaging takes place at station 44. The steam boiler 45 provides the heat for the heat exchanger 14 and also for the columns 19 and 31.

A facility to store the distillate (which will not readily ferment) and also the concentrate provides the operator with a great deal of flexibility. He can for example extract additional sugar from the sweeter grapes which are available later during the vintage, providing a high Baume residue which will take a long time to ferment, and yet occupy only a small storage space. He will have different distillates for blending purposes, and the blending and production can take place throughout most of the year, both of the concentrate and also of the grape juice drink. The grape juice drink can contain a small quantity of alcohol if such is required, or can be completely free of alcohol when it is released from the second still 23. Since the remix is with the distillate from the grape juice, the reconstitution of the grape juice will result in a return of most of the original flavours, except that its sweetness will be largely reduced.

The watery distillate and concentrate of 35 Baume, of the early vintage where the grapes are still high in acid, are best used for the grape juice drink, and the concentrate at 35 Baume from later in the vintage, when the sugar content is highest, is best used for the second stage concentrate. The watery distillate from this concentrate is also used for the grape juice drink. Both these distillates have a high residual $SO_2$ content and thus can preserve themselves during storage time. Both concentrates of 35 Baume from the early and later in the vintage are stored away under slow preserving fermenting conditions and are in turn used for the grape juice drink and for the concentrate after the alcohol has been extracted (for brandy) under vacuum conditions.

What is claimed is:

1. A method of producing a grape juice concentrate comprising:
   (a) crushing sound grapes and separating juice from pulp,
   (b) subjecting the separated grape juice to a first stage vacuum concentration at a temperature of between 40° C. and 80° C. under vacuum conditions of between 12 and 15 pounds per square inch (84 and 105 kPa), to produce a first stage grape juice concentrate which has a solids content of between 25 and 40 Baume, and a distillate,
   (c) transferring the first stage concentrate to a container and storing said concentrate in the container in the presence of alcohol
   (d) subsequently separating at least some of said alcohol from the first stage concentrate, subjecting the first stage concentrate to a second stage of vacuum concentration also at a temperature of between 40° C. and 80° C. under vacuum conditions of between 12 and 15 pounds per square inch (84 and 105 kPa) to remove any remaining alcohol and to produce a second stage grape juice concentrate which has a Baume of between 38 and 55, and
   (e) packaging the second stage grape juice concentrate in containers.

2. A method according to claim 1 wherein said first stage grape juice concentrate is pasteurized and placed into a holding tank, a layer of alcohol is placed over the first stage pasteurized concentrate and the tank sealed, the first stage concentrate and alcohol are stored in the container, and subsequently the concentrate is withdrawn from the base of the container, and the alcohol is recovered.

3. A method according to claim 1 further comprising fermenting the first stage grape juice concentrate during its said storage, retaining the concentrate in a container with an ullage space above the concentrate during fermentation and retaining carbon dioxide from the fermentation in the ullage space above the concentrate.

4. A method according to claim 1 further comprising fermenting the first stage grape juice concentrate during its said storage, retaining the concentrate in a container with an ullage space above the concentrate during fermentation and retaining carbon dioxide from that fermentation in the ullage space above the concentrate, subjecting the fermented first stage concentrate to said second stage of vacuum concentration and separating therefrom the alcohol of fermentation as a distillate before packaging the second stage concentrate in said containers.

5. A method according to claim 4 further comprising using said alcohol distillate in brandy production.

6. A method according to claim 1 further comprising clarifying the grape juice with bentonite before subjecting the grape juice to its first stage vacuum concentration.

7. A method according to claim 1 further comprising adding a particulate compound of calcium to the grape juice before submitting the first stage concentrate to its second stage concentration, in sufficient quantity and for sufficient time to raise the pH of the grape juice above 4.

8. A method according to claim 1 comprising storing the distillate, and separately storing aromatics which are released upon said heating of the grape juice before its said second stage concentration, and remixing some of the aromatics with the second stage concentrate before packaging.

9. A method according to claim 8 further comprising mixing some at least of one of said distillate and aromatics with the first stage concentrate to produce a fruit juice drink.

10. A method according to claim 1 comprising heating the grape juice for sufficient time and to a sufficient temperature to pasteurise it, and temporarily storing the grape juice before stage (b) of claim 3.

11. A method according to claim 1 comprising storing the second stage concentrate for at least a week, and creaming the concentrate by high speed agitation for between 5 and 35 minutes.

12. A method according to claim 1 comprising seeding the second stage concentrate with disaccharide crystals, and creaming the concentrate by high speed agitation for between 5 and 35 minutes.

* * * * *